(12) United States Patent
Bentley

(10) Patent No.: US 10,310,249 B1
(45) Date of Patent: Jun. 4, 2019

(54) BINOCULAR ADAPTOR ASSEMBLY

(71) Applicant: Ephraim Blu Bentley, Flagstaff, AZ (US)

(72) Inventor: Ephraim Blu Bentley, Flagstaff, AZ (US)

(*) Notice: Subject to any disclaimer, the term of this patent is extended or adjusted under 35 U.S.C. 154(b) by 0 days.

(21) Appl. No.: 16/240,728

(22) Filed: Jan. 5, 2019

(51) Int. Cl.
*G02B 23/18* (2006.01)
*F16M 11/04* (2006.01)
*F16M 11/32* (2006.01)

(52) U.S. Cl.
CPC ............ *G02B 23/18* (2013.01); *F16M 11/04* (2013.01); *F16M 11/32* (2013.01); *F16M 2200/02* (2013.01)

(58) Field of Classification Search
None
See application file for complete search history.

(56) References Cited

U.S. PATENT DOCUMENTS

| 1,854,951 | A |   | 4/1932  | Neuwirth |           |
|-----------|---|---|---------|----------|-----------|
| 2,834,567 | A |   | 5/1958  | Young    |           |
| 3,109,617 | A | * | 11/1963 | Meyer    | F16M 11/041 |
|           |   |   |         |          | 248/183.2 |
| 4,085,915 | A |   | 4/1978  | Song     |           |
| 4,320,885 | A |   | 3/1982  | Kawazoe  |           |
| 4,557,451 | A |   | 12/1985 | Conway   |           |
| 5,337,100 | A |   | 8/1994  | Oxford   |           |
| 5,732,912 | A | * | 3/1998  | Nomura   | F16C 11/103 |
|           |   |   |         |          | 248/187.1 |
| 5,938,155 | A |   | 8/1999  | Garland  |           |
| 6,026,548 | A | * | 2/2000  | Jackson  | A43C 7/08 |
|           |   |   |         |          | 24/115 G  |
| 6,234,690 | B1|   | 5/2001  | Lemieux  |           |
| 6,460,815 | B1|   | 10/2002 | Thaler   |           |
| 6,540,185 | B2|   | 4/2003  | Ishikawa et al. |    |
| 6,779,932 | B2| * | 8/2004  | DeSorbo  | F16M 11/041 |
|           |   |   |         |          | 396/419   |
| 7,303,171 | B1| * | 12/2007 | Chen     | B60R 11/00 |
|           |   |   |         |          | 224/908   |
| 7,694,923 | B2|   | 4/2010  | Congdon et al. |     |
| 7,780,126 | B2|   | 8/2010  | Druker et al.  |     |
| 7,905,459 | B2|   | 3/2011  | Cameron et al. |     |
| 8,264,771 | B2|   | 9/2012  | Yamamoto |           |
| 8,985,877 | B1| * | 3/2015  | Brewer   | F16B 2/18 |
|           |   |   |         |          | 396/419   |
| 2008/0247746 | A1 | | 10/2008 | Law et al. |        |

FOREIGN PATENT DOCUMENTS

EP            1160499 A1 * 12/2001 ........... F16M 11/041

* cited by examiner

*Primary Examiner* — Derek S. Chapel
(74) *Attorney, Agent, or Firm* — Invention to Patent Services; Alex Hobson

(57) ABSTRACT

A binocular adaptor system enables quick and secure attachment of binoculars to a stand, such as a tripod stand. The binocular adaptor assembly utilizes an adaptor body that has a stand end for coupling with a stand and a clamp end for receiving a clamp. The clamp is configured to extend into a clamp aperture in the adaptor body and has a clamp pin aperture to receive a lock pin. A spring is configured between an insert end of the clamp and the adaptor body to provide a force against the insert end of the clamp. When a lock pin in inserted into the clamp aperture, the spring engages a lock stop of the clamp with an insert lock portion of the lock pin to secure the lock pin in place. A lock sleeve can then be tightened to prevent pressing of the button.

20 Claims, 10 Drawing Sheets

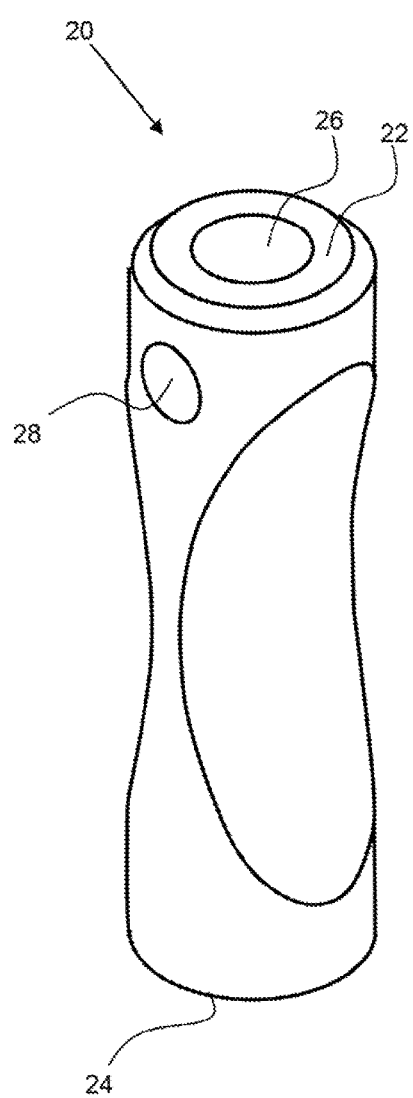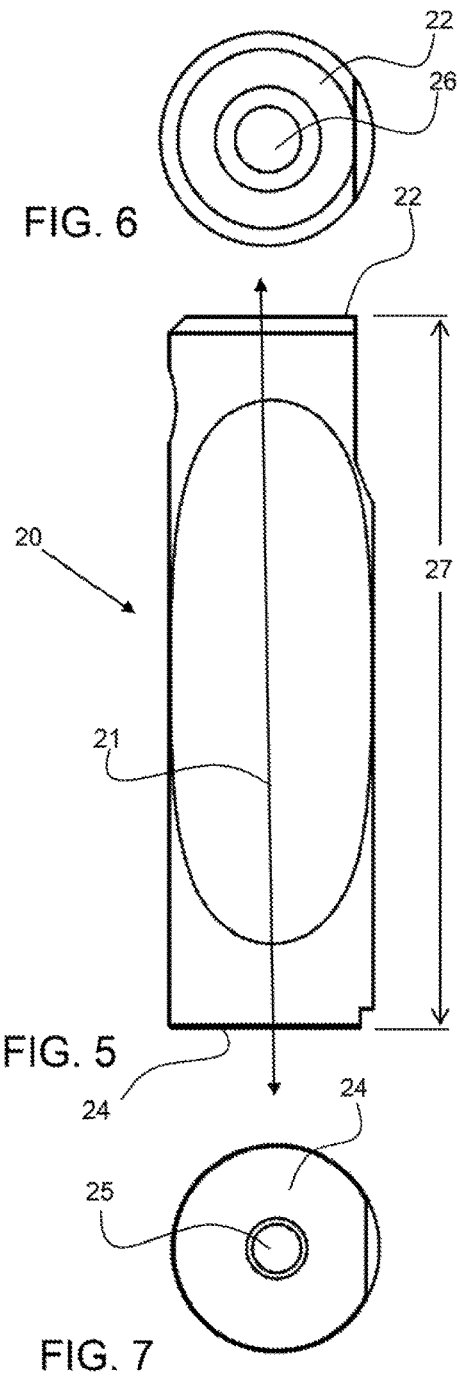
FIG. 6
FIG. 5
FIG. 4
FIG. 7

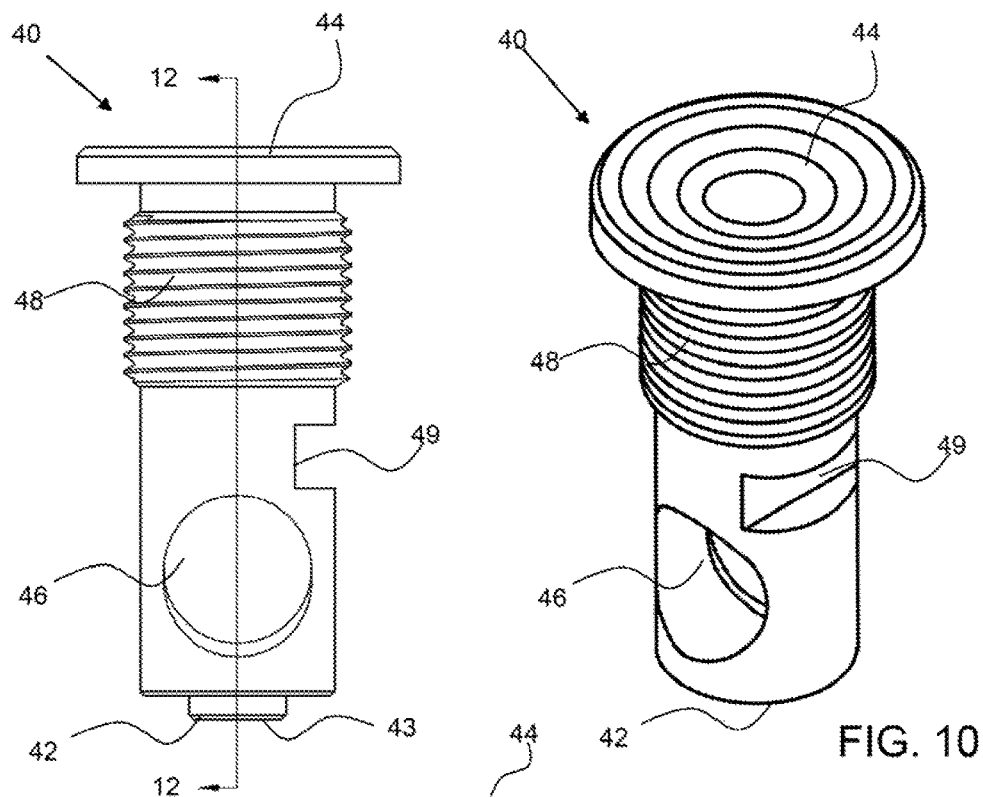
FIG. 11
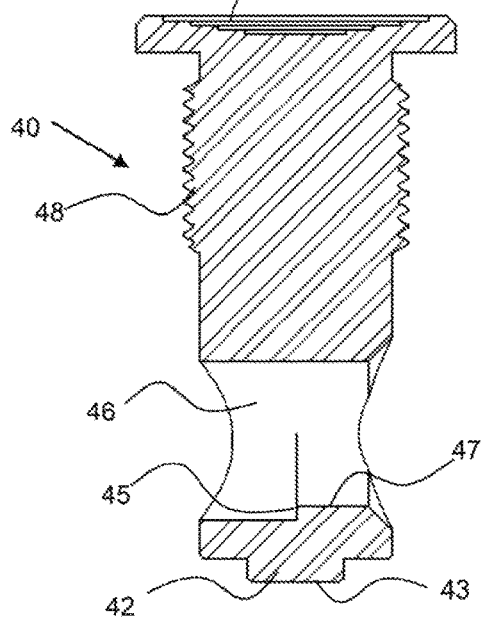
FIG. 10
FIG. 12

BINOCULAR ADAPTOR ASSEMBLY

BACKGROUND OF THE INVENTION

Field of the Invention

The invention relates to an adaptor assembly for coupling binoculars to a stand.

Background

Spotting and viewing objects through binoculars can be difficult when holding the binoculars, especially when trying to view objects at great distances away. The subtle shaking when holding the binoculars is magnified making the viewed object move into and out of the field of view. Many people, such as hunters, mount binoculars to a stand to eliminate this problem. Tripod stands have an attachment feature to attach cameras to the top, however an adapter is required to mount to an attachment feature of the binoculars, typically configured between the lens. Currently available binocular tripod adapters are cumbersome to install and, in some cases, provide no locking mechanism to lock the binoculars to the adapter.

SUMMARY OF THE INVENTION

The invention is directed to a binocular adaptor system that enables quick and secure attachment of binoculars to a stand, such as a tripod stand. An exemplary binocular adaptor assembly comprises an adaptor body that has a stand end for coupling with a stand and a clamp end for receiving a clamp. The clamp is configured to extend into a clamp aperture in the adaptor body and has a clamp pin aperture to receive a lock pin. The adaptor body also has a body pin aperture that aligns with the clamp aperture to allow a lock pin to extend into the adaptor body and into the aperture in the clamp. A spring is configured between an insert end of the clamp and the adaptor body and may be configured in a spring cavity of the adaptor body to provide an ejecting force or force against the insertion of the clamp into the clamp aperture of the adaptor body. A button end of the clamp, the end extending out from the adaptor body may have to be pressed to compress the spring to align the clamp aperture in the adaptor body with the clamp pin aperture in the clamp. A lock pin can then be inserted into these aligned apertures. An exemplary lock pin has a insert lock, or a step along an insert portion that engages with a lock stop, or step along the clamp pin aperture to secure the lock pin in a position along the clamp pin aperture. With the button released, the engagement of the lock stop with the insert lock secures the lock pin in the clamp pin aperture. A lock sleeve configured around the clamp may be tightened, whereby the clamp is forces outward from the clamp aperture in the adaptor body to create a force against the lock pin. Also, tightening of the lock sleeve may prevent the button end of the clamp from be pressed inward to release the lock pin. To detach the lock pin from the adaptor body, the lock sleeve may have to be loosened and then the button can be pressed to compress the spring and allow the removal of the lock pin. A pair of binoculars can be attached to the lock pin and therefore, the binoculars can be securely attached to a stand and locked in position using the binocular adaptor system as described herein.

An exemplary adaptor body provides a coupling between a stand and a pair of binoculars. The adaptor body clamp aperture may be orthogonal along a length or insert axis to the body pin aperture. An exemplary adaptor body may have a threaded stand attachment, such as a female threaded aperture to receive a threaded post extending from the top of a tripod stand. The stand attachment may be a male threaded post however. In an exemplary embodiment, an adaptor body extend vertically along a length axis and has a length of about 30 mm or more, about 50 mm or more, about 75 mm or more, about 100 mm or more, about 150 mm or more, about 200 mm or less and any range between and including the length values provided.

An exemplary clamp is configured to be inserted into the clamp aperture of the adaptor body and secure a lock pin in place. The binoculars are configured to be attached to the lock pin and the clamp secures the lock pin to the adaptor body and therefore to the stand. An exemplary clamp has an insert end that is inserted down into the clamp aperture of the adaptor body and a button end that extends out from the clamp aperture. A spring is configured in the adaptor body and configured to engage and press against the insert end. A lock sleeve is configured between the clamp end, or top, of the adaptor body and the button end of the clamp. The lock sleeve may resemble a nut and have threads that engage with sleeve receiver threads of the clamp. The lock sleeve may have planar surfaces to allow the use of a wrench to tighten the lock sleeve. An exemplary clamp has a clamp pin aperture for receiving the lock pin. The clamp pin aperture may align with the body pin aperture in the adaptor body when the clamp is pressed by the button down to compress the spring. The spring may be any suitable elastic device, such as a living hinge, a wound spring or a piece of elastic material. The elastic device provides a force against the insert end of the clamp and can be compressed but will return substantially to an original uncompressed state when the compression force is removed. An exemplary clamp may have a set screw slot, or a planar portion of clamp for receiving a set screw end to prevent twisting of the clamp within the clamp aperture. The set screw may further prevent the clamp from being displaced along the length axis of the clamp aperture. An exemplary clamp has a lock stop, such as a step along the clamp pin aperture configured to engage with an insert lock portion of the lock pin. The insert lock is configured along the insert portion of the lock pin and comprises a step or a lock step surface that prevents the lock pin from being remove or pulled out of the clamp pin aperture.

An exemplary lock pin has an insert end and an attachment end. The attachment end may comprise a threaded portion, such as a threaded post for attachment to binoculars. An exemplary lock pin may also have an interface, or a flange portion to enable attachment and detachment from binoculars. An exemplary lock pin comprises an insert portion having an insert lock, such as a recessed or reduced diameter portion for engagement with a lock stop of the clamp. A lock pin may have pin set screw aperture to receive a set screw and it may be configured in the interface portion of the lock pin.

The components of the binocular adaptor system are configured to enable quick and secure attachment of binoculars to a stand. The button portion of the clamp allows for compression of the spring and insertion of the lock pin with binoculars coupled thereto. Releasing of the button engages the insert lock and lock stop to prevent the lock pin from being pulled out. The lock sleeve can then be tightened to prevent pressing of the button and inadvertent release of the lock pin.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 4 shows a perspective view of an exemplary adaptor body having a clamp aperture in a clamp end and a body pin aperture that extends through the side of the adaptor body.

FIG. 5 is a side view of the exemplary adaptor body shown in FIG. 4.

FIG. 6 is a clamp end view of the adaptor body shown in FIG. 5.

FIG. 7 is a stand end view of the adaptor body shown in FIG. 5.

FIG. 10 is a perspective view of an exemplary clamp having an insert end, a button end and a clamp pin aperture to receive the lock pin.

FIG. 11 is a side view of the clamp shown in FIG. 10.

FIG. 12 is a cross-sectional view of the clamp along line 12-12 of FIG. 11.

Figure 1:
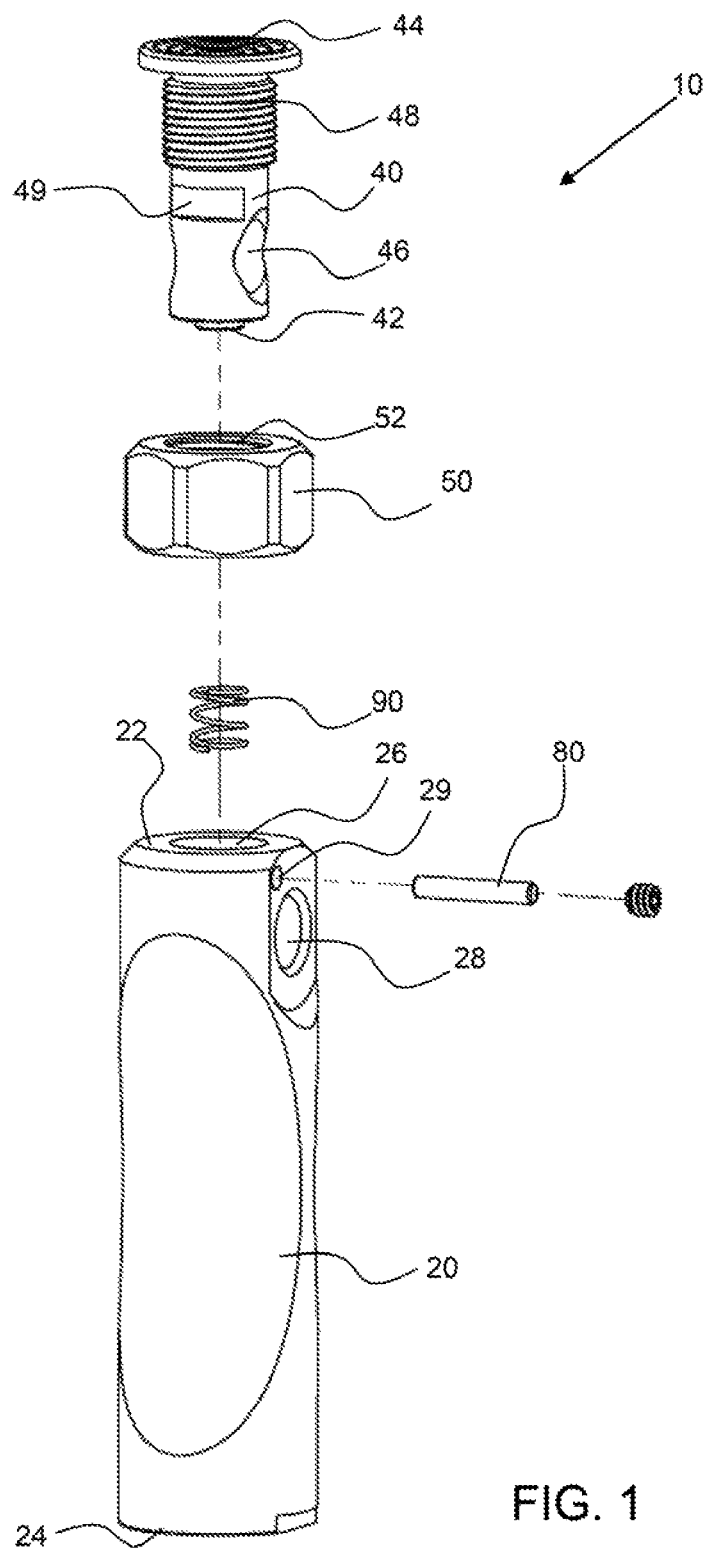
FIG. 1 shows an exploded view of an exemplary binocular adaptor system comprising a binocular adaptor assembly comprising an adaptor body for receiving a clamp and a lock pin.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

A threaded attachment may comprise male or female threads.

Substantially orthogonal as used herein to describe the steps with respect to the respective length axis, means that the steps are within about 20 degrees of orthogonal and more preferably within about 10 degrees of orthogonal.

Figure 2:
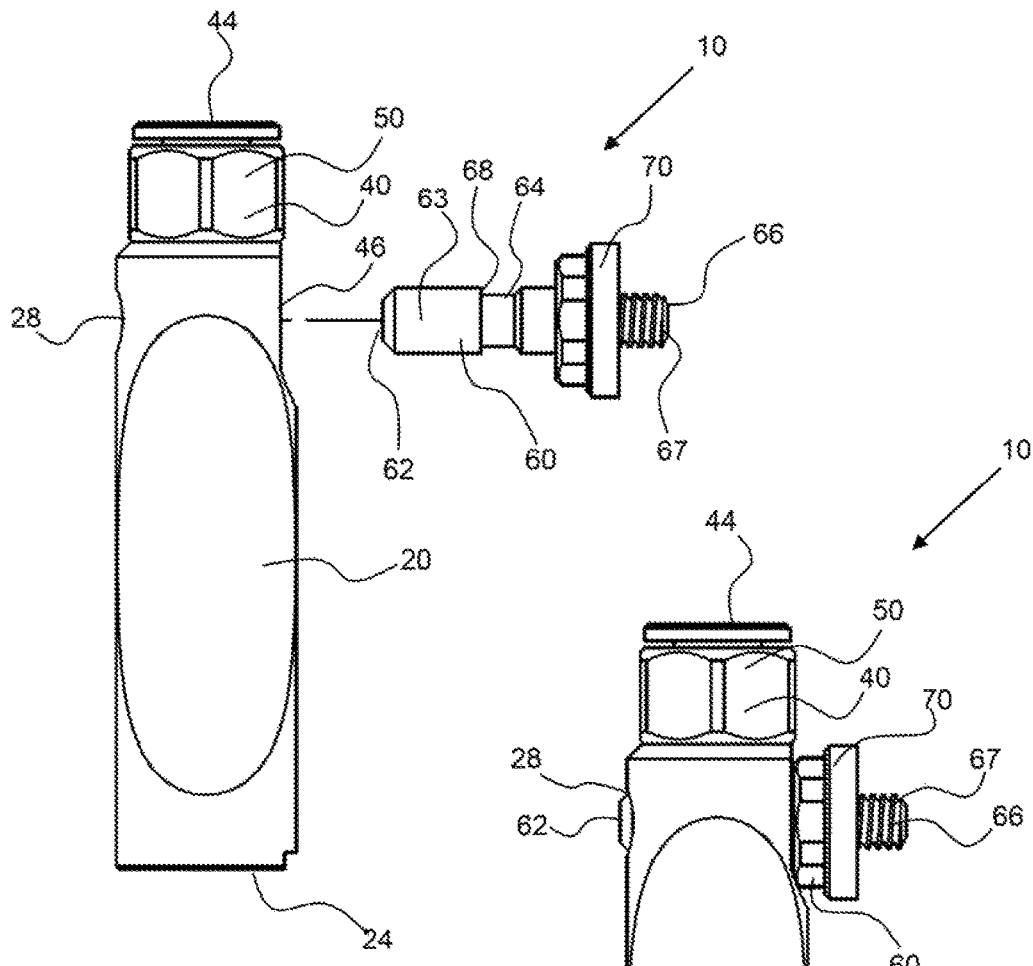
FIG. 2 shows a side view of an exemplary binocular adaptor assembly with the clamp configured in the clamp aperture of the adaptor body and the lock pin aligned with the clamp pin aperture and body pin aperture; the button is pushed to align the clamp pin aperture with the body pin aperture.
Figure 3:
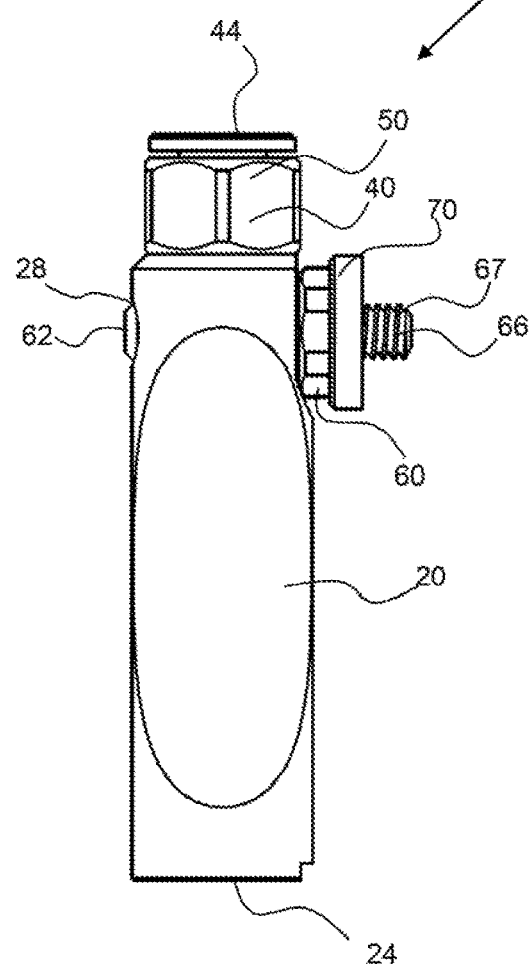
FIG. 3 shows a side view of the exemplary binocular adaptor assembly of FIG. 2, with the lock pin inserted into the adaptor body and clamp and the button released to engage the lock stop of the clamp with the insert lock of the lock pin.

Referring to FIGS. 1 to 3, an exemplary binocular adaptor system comprises a binocular adaptor assembly 10 comprising an adaptor body 20 for receiving a clamp 40 and a lock pin 60. The adaptor body has a length from clamp end 22 to a stand end 24. As shown in FIG. 1, the clamp 40 extends through the lock sleeve 50 and into the clamp aperture 26 of the adaptor body. The clamp has sleeve receive threads 48 for coupling with the lock sleeve threads 52 of the lock sleeve. When the lock sleeve is rotated, the clamp is moved in or out of the clamp aperture 26. A spring 90 is configured in the bottom of the clamp aperture and pushes up on the clamp aperture. A set screw 80 extends into the set screw aperture 29 of the adaptor body 20 and seats against the planar surface of the set screw slot 49 on the clamp 40. As shown in FIG. 2, an exemplary binocular adaptor assembly 10 has the clamp 40 configured in the clamp aperture of the adaptor body 20 and the lock pin 60 aligned with the clamp pin aperture 46 and body pin aperture 28. The button 44 end of the clamp 40 is pushed down to compress the spring 90 and to align the clamp pin aperture with the body pin aperture to allow the lock pin to be inserted into the adaptor body 20 and through the clamp 40. As shown in FIG. 3, the lock pin 60 is configured in adaptor body and through the pin aperture of the clamp. The lock sleeve 50 can be turned to back-out the clamp from the clamp aperture in the adaptor body 20 to secure the lock pin in place, as will be detailed further herein. The clamp has a length from a button end 44 to an insert end 42. The lock pin 60 has a length from an insert end 62 to an attachment end 66. An insert portion 63 of the lock pin has an insert lock 64 comprising a lock step surface 68 that is substantially orthogonal to the length axis of the lock pin. The lock pin has a mount pin collar 70.

Referring now to FIGS. 4 to 7, an exemplary adaptor body 20 has a clamp aperture 26 in a clamp end 22 and a body pin aperture 28 that extends through the side of the adaptor body. The adaptor body has a stand attachment 25 configured on the stand end of the adaptor body. The stand attachment may be a threaded aperture for receiving a threaded post on a tri-pod stand, for example. The adaptor body may have an irregular shape to allow manual attachment to a stand, such as by rotating the stand attachment to the stand. As shown in FIG. 5, an adaptor body 20 has a length axis 21 and length 27. The clamp aperture 26 may have a length axis that is aligned with the length axis of the adaptor body and the pin aperture 28 may be substantially orthogonal to the length axis of the adaptor body and/or length axis of the clamp aperture.

Figure 8:
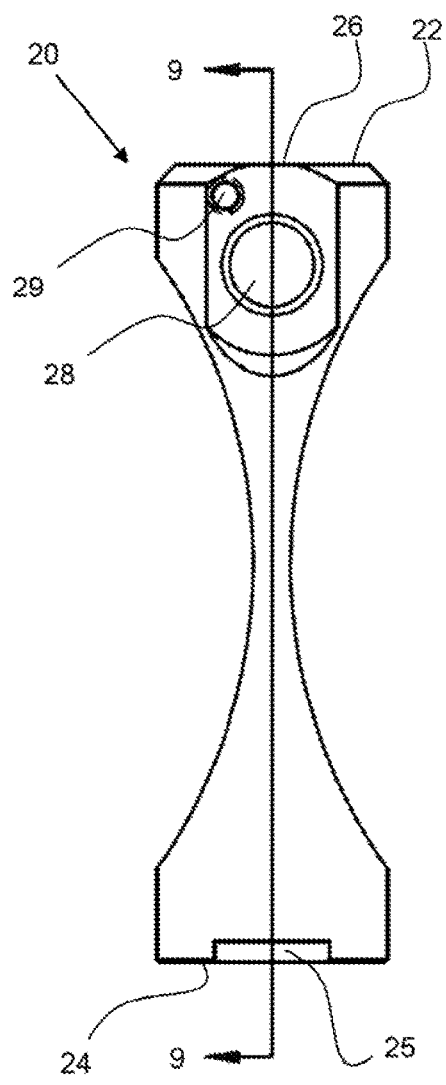
FIG. 8 is a side view of the exemplary adaptor body shown in FIG. 4.
Figure 9:
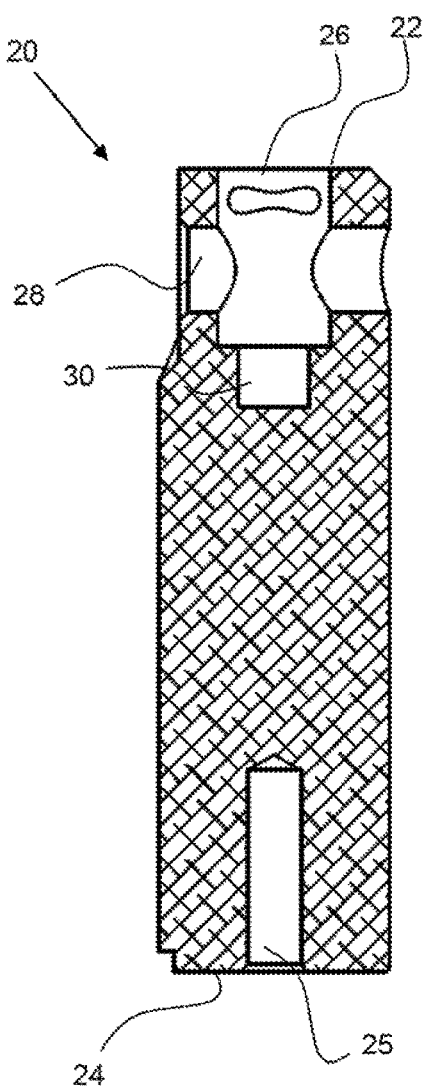
FIG. 9 is a cross-sectional view of the adaptor body taken along line 9-9 of FIG. 8.

Referring now to FIGS. 8 and 9, an exemplary adaptor body 20 has a clamp aperture 26 having an opening on the clamp end 22 and extending along the length axis of the adaptor body. A spring cavity 30 is configured on an extended end of the clamp aperture 26 and is for retaining a spring therein. The spring pushed on the clamp to retain the lock pin in place when inserted. The adaptor body 20 also has a screw aperture for receiving a set screw.

Referring now to FIGS. 10 to 12, an exemplary clamp 40 has an insert end 42, a button end 44 and clamp pin aperture 46 to receive the lock pin. The adaptor body also has a set screw slot or planar portion to receive an insert end of a set screw and to prevent the clamp from rotating within the clamp aperture of the adaptor body. The clamp pin aperture 46 has a lock stop 47 or a step along the length of the clamp pin aperture. The step of the lock stop has a lock clamp surface 45 that may extend substantially orthogonally to the length axis of the clamp pin aperture. This orthogonal lock clamp surface 45 may prevent the lock pin from being pulled out when in contact with the lock step surface. This step is a reduction in dimension along a surface of the clamp pin aperture that engages with a step of a lock clamp surface in the lock pin insert portion to secure the lock pin in place. The clamp also has a spring extension 43 that extends into the spring cavity of the clamp aperture.

Figure 13:
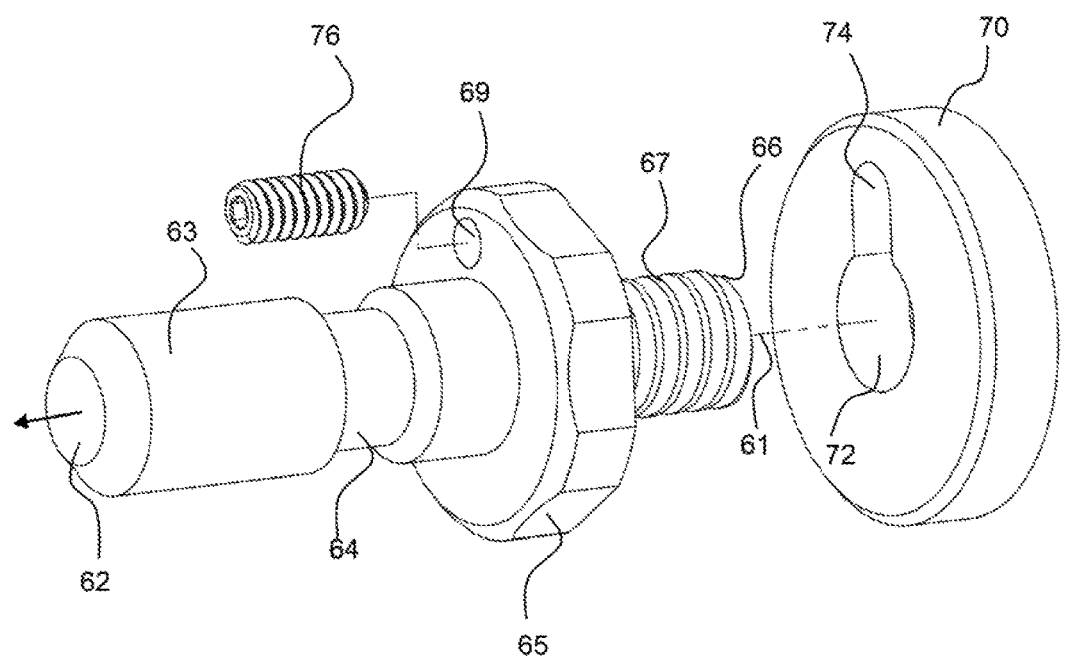
FIG. 13 is a perspective view of an exemplary lock pin having an insert portion on an insert end a threaded attachment on an attachment end.
Figure 14:
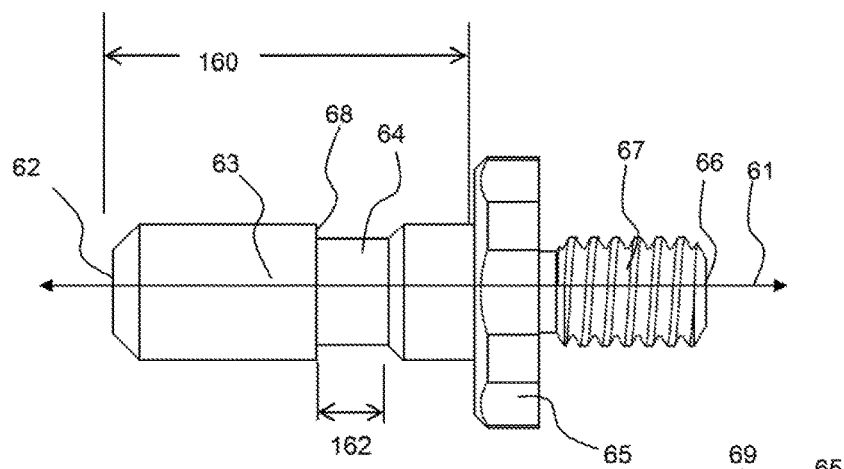
FIG. 14 is a side view of the lock pin shown in FIG. 13.
Figure 15:
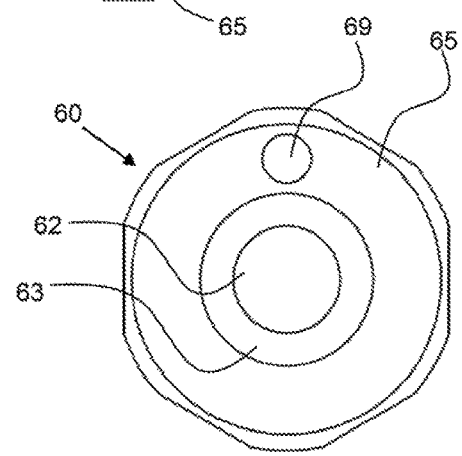
FIG. 15 is an insert end view of the lock pin shown in FIG. 13.
Figure 17:
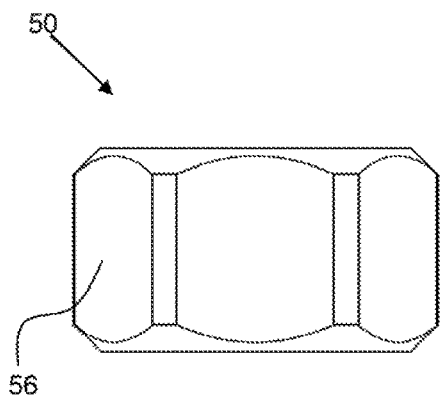
FIG. 17 is a side view of the lock sleeve shown in FIG. 16.
Figure 16:
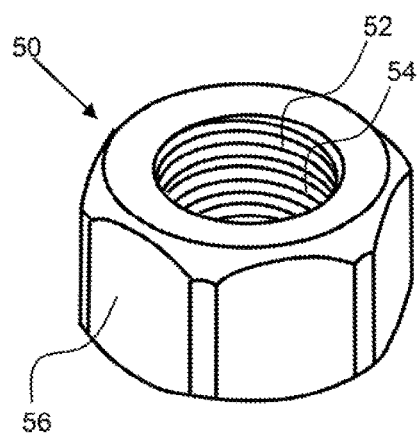
FIG. 16 is a perspective view of an exemplary lock sleeve having a threaded lock sleeve aperture for engagement with sleeve receiver threads of the clamp.
Figure 18:
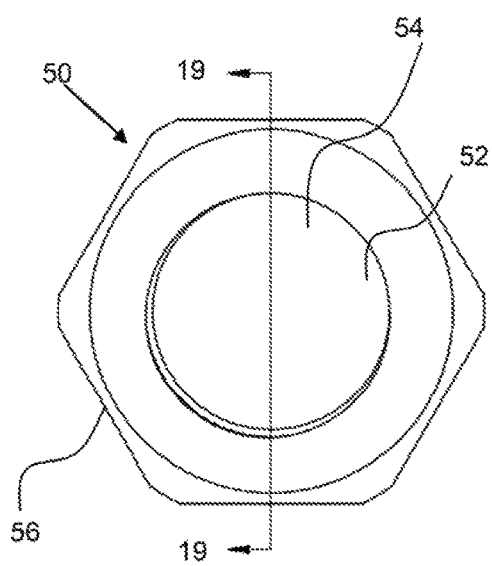
FIG. 18 is a top view of the lock sleeve shown in FIG. 16.
Figure 19:
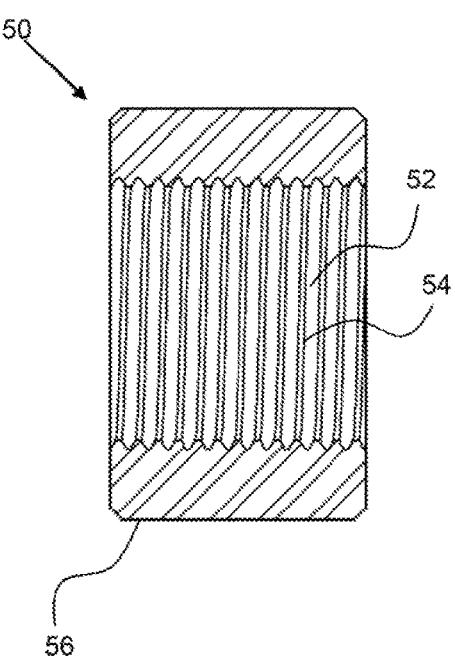
FIG. 19 is a cross-sectional view of the lock sleeve taken along line 19-19 of FIG. 18.

Referring to FIGS. 13 to 15, an exemplary lock pin 60 has an insert portion 63 proximal to the insert end 62, a threaded attachment 67 on an attachment end 66 having a threaded portion; a male thread portion as shown. A collar 70 is configured to extend over the attachment end and has an attachment aperture 72 and a set screw aperture 74. A set screw 76 is configured to extend through the set screw aperture of the collar and through the set screw aperture 69 of the interface 65 of the lock pin 60. The lock pin has an insert lock 64, a portion of the insert portion with an offset distance from the length axis 61 of the lock pin. As shown in FIG. 14, a lock pin has an insert lock 64 having a length 162 that is a portion of the length 160 of the insert portion 63. The insert lock comprises a step or lock step surface 68 that extends substantially orthogonal to a length axis 61 of the lock pin to define the smaller diameter insert lock portion of the insert portion. This lock step surface engages with the lock stop, or step surface of the clamp, to secure the lock pin in the clamp.

Referring now to FIGS. 16 to 19, an exemplary lock sleeve 50 has a threaded lock sleeve aperture 52 and sleeve threads 54 for engagement with sleeve receiver threads of the clamp. The lock sleeve has the general shape of a threaded nut and has planar engagement surfaces 56 for tightening the lock sleeve with respect to the clamp.

Figure 20:
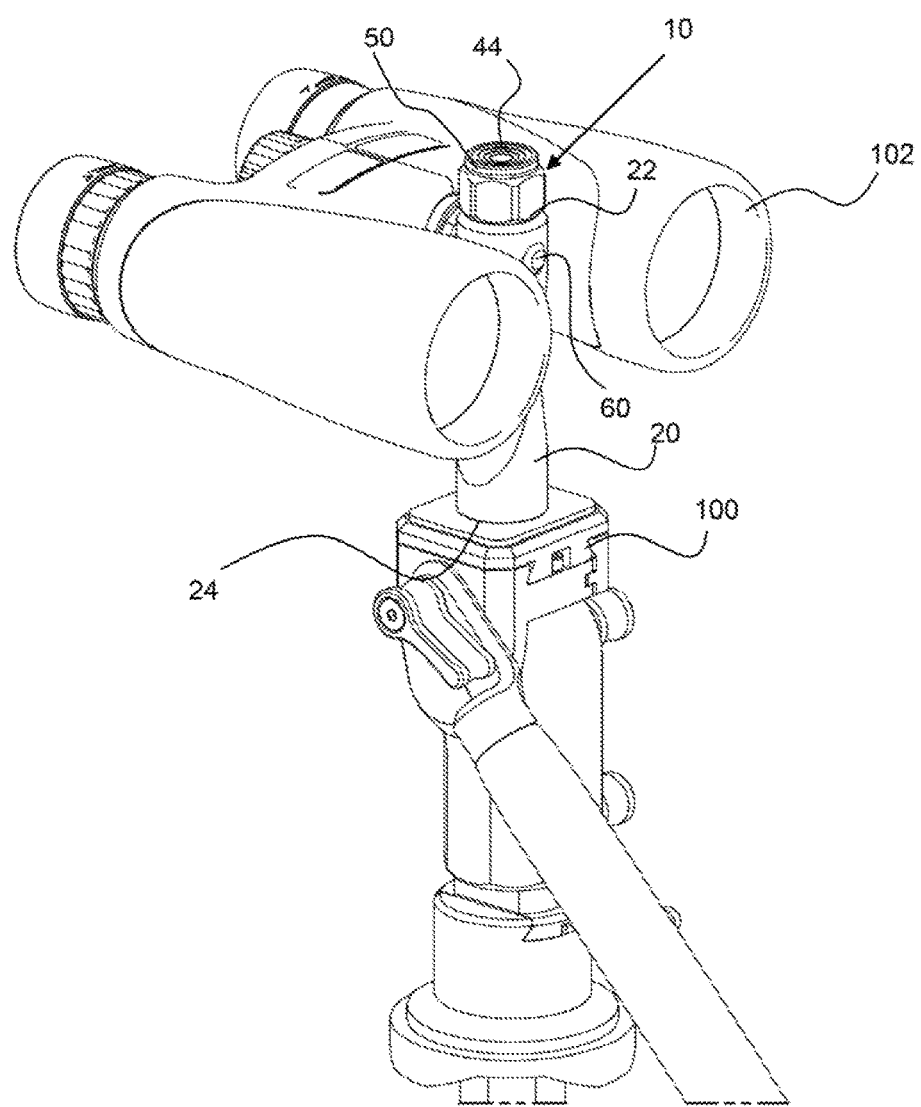
FIG. 20 is a perspective view of an exemplary adaptor assembly detachably attached to a tri-pod stand and a pair of binoculars attached to the adaptor assembly by the threaded attachment on the lock pin.
Figure 21:
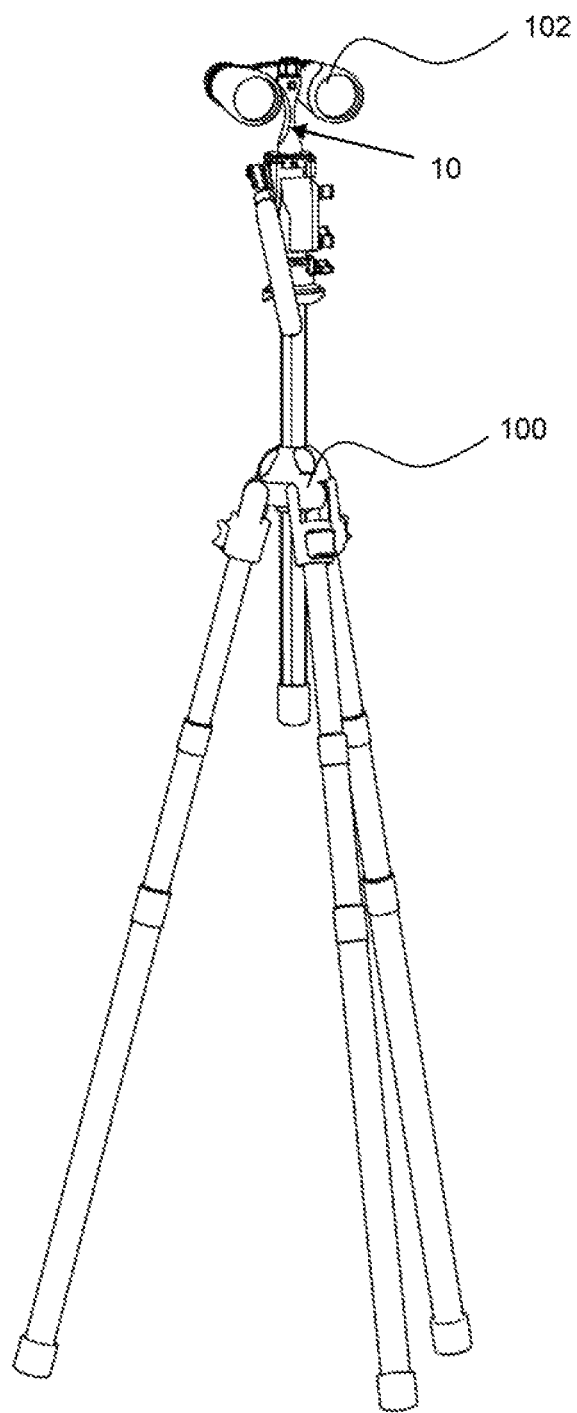
FIG. 21 is a perspective view of an adaptor assembly configured between a tri-pod stand and a pair of binoculars.

Referring now to FIGS. 20 and 21, an exemplary adaptor assembly 10 is configured between a stand 100 and a pair of binoculars 102. The stand is coupled to the stand end 24 of the adaptor body 20 and the clamp is inserted into the adaptor body to retain the lock pin 60. The binoculars are detachably attached to the attachment end of the lock pin. FIG. 21 shows an exemplary adaptor assembly 10 detachably attached to a tri-pod stand 100 and a pair of binoculars 102 attached to the adaptor assembly by the threaded attachment on the lock pin.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A binocular adaptor system comprising a binocular adaptor assembly comprising:
   a) an adaptor body comprising:
      i) a stand end for coupling with a stand;
      ii) a clamp end having a clamp aperture; and
      iii) a body pin aperture to receive a lock pin;
   b) a clamp configured in the clamp aperture of the adaptor body, said clamp comprising:
      i) an insert end configured in the clamp aperture;
      ii) a button end that extends out from the clamp aperture;
      iii) a clamp pin aperture for receiving said lock pin;
      iv) a lock stop configured along the clamp pin aperture;
      v) sleeve receiver threads for coupling with a lock sleeve;
   c) said lock pin comprising:
      i) an insert end;
      ii) an insert portion;
      iii) an insert lock configured along the insert portion for engaging with the lock stop of the clamp pin aperture;
      iv) an attachment end;
   d) said lock sleeve coupled with the sleeve receiver threads proximal to the button end of the clamp;
   e) a spring configured in the clamp aperture and compressed by the clamp;
   wherein the clamp is configured inside of the clamp aperture with the clamp pin aperture aligned with the body pin aperture of the adaptor body when the button end of the clamp is pressed to compress said spring;
   wherein the lock pin is configured with the insert portion inserted into the body pin aperture of the adaptor body and through the clamp pin aperture of the clamp;
   wherein the lock sleeve is turned to engage the lock stop with the insert lock of the lock pin to prevent the lock pin from being pulled out of the clamp pin aperture.

2. The binocular adaptor system of claim 1, wherein the insert lock is a step along the insert portion of the lock pin.

3. The binocular adaptor system of claim 2, wherein the lock stop is a step along the clamp pin aperture that is configured to align with the insert lock.

4. The binocular adaptor system of claim 3, wherein the insert lock step is a portion of the insert portion that is smaller in diameter than an adjacent insert portion.

5. The binocular adaptor system of claim 4, wherein the insert lock step comprises a lock step surface that is substantially perpendicular to a linear axis of the lock pin.

6. The binocular adaptor system of claim 1, wherein the insert end of the lock pin is tapered to allow easy insertion of the lock pin into the clamp pin aperture.

7. The binocular adaptor system of claim 1, wherein the attachment end of the lock pin comprises a threaded attachment.

8. The binocular adaptor system of claim 7, wherein the threaded attachment of the lock pin comprises male threads.

9. The binocular adaptor system of claim 1, wherein the adaptor body comprises a spring cavity at an extended end of the clamp aperture for receiving said spring.

10. The binocular adaptor system of claim 1, further comprising a collar that extends over the attachment end of the lock pin and is detachably attachable to the lock pin.

11. The binocular adaptor system of claim 1, further comprising a set screw that extends through the lock pin and into the adaptor body to prevent the lock pin from rotating within the clamp pin aperture.

12. The binocular adaptor system of claim 11, wherein the set screw extends through an interface portion of the lock pin.

13. The binocular adaptor system of claim 12, wherein the set screw extends through an aperture in the collar.

14. The binocular adaptor system of claim 1, wherein the spring in a wound spring.

15. The binocular adaptor system of claim 1, wherein the lock sleeve is a nut having flat engagement surfaces.

16. A binocular adaptor system comprising a binocular adaptor assembly comprising:
    a) an adaptor body comprising:
        i) a stand end for coupling with a stand;
        ii) a clamp end having a clamp aperture; and
        iii) a body pin aperture;
    b) a clamp configured in the clamp aperture of the adapter body, said clamp comprising:
        i) an insert end configured in the clamp aperture;
        ii) a button end that extends out from the clamp aperture;
        iii) a clamp pin aperture for receiving a lock pin and comprising a lock stop comprising a step configured along the clamp pin aperture;
        iv) sleeve receiver threads for coupling with a lock nut;
    c) said lock pin comprising:
        i) an insert end;
        ii) an insert portion having an insert lock comprising a step in the insert portion for engaging with the step of the lock stop of the clamp pin aperture;
        iii) an attachment end comprising a threaded portion;
    wherein the insert lock is smaller in diameter than an adjacent portion of the insert portion of the lock pin and wherein the step of the insert lock extends from the insert lock portion of the insert portion and said adjacent portion;
    d) said lock nut coupled with the sleeve receiver threads proximal to the button end of the clamp and having flat engagement surfaces;
    e) a spring configured in the clamp aperture and compressed by the clamp;
    wherein the clamp is configured inside of the clamp aperture with the clamp pin aperture aligned with the body pin aperture of the adaptor body when the button end of the clamp is pressed to compress said spring;
    wherein the lock pin is configured with the insert portion inserted into the body pin aperture of the adaptor body and through the clamp pin aperture of the clamp;
    wherein the lock nut is turned to engage the lock stop with the insert lock of the lock pin to prevent the lock pin from being pulled out of the clamp pin aperture.

17. The binocular adaptor system of claim 16, further comprising a set screw that extends through the lock pin and into the adaptor body to prevent the lock pin from rotating within the clamp pin aperture.

18. The binocular adaptor system of claim 17, wherein set screw extends through an interface portion of the lock pin.

19. The binocular adaptor system of claim 18, wherein the set screw extends through an aperture in the collar.

20. The binocular adaptor system of claim 16, wherein the spring in a wound spring.

* * * * *